July 17, 1934.  I. LUBARSKY  1,967,123
SCRAPER
Filed Oct. 8, 1932
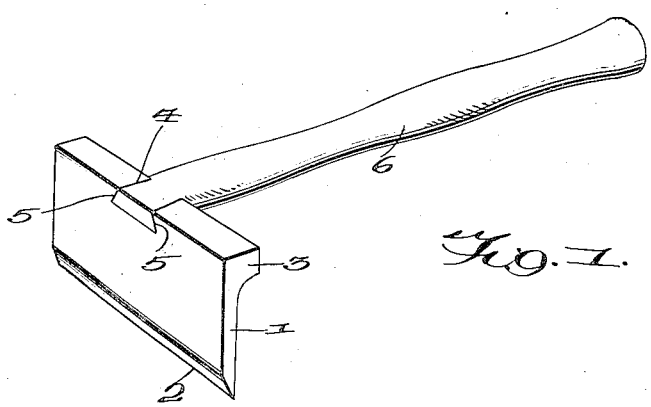
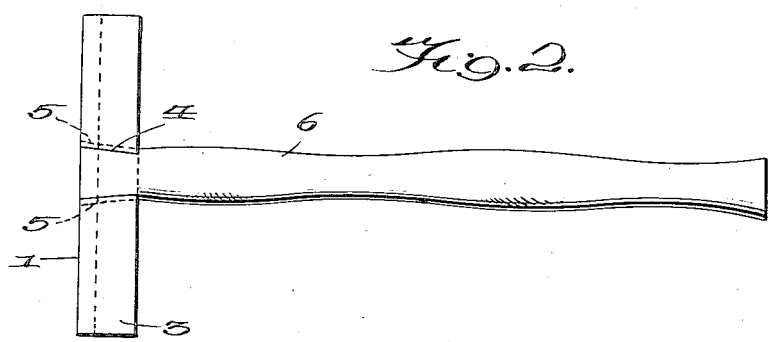
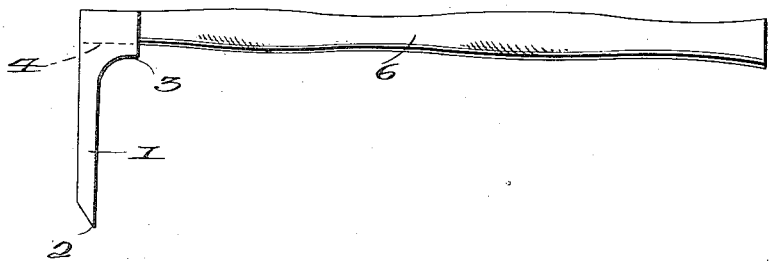
Inventor
Isaak Lubarsky
By Vernon E. Hodges
his Attorney

UNITED STATES PATENT OFFICE 1,967,123

SCRAPER

Isaak Lubarsky, Detroit, Mich.

Application October 8, 1932, Serial No. 636,878

2 Claims. (Cl. 145—47)

This invention relates to an improvement in scrapers particularly for the scraping of glue, although it may be used for the scraping of floors or anywhere else as found desirable.

My improvement relates to the construction of a scraping blade which is provided with a notch in its upper edge having undercut sides for receiving the end of a handle in order to prevent the handle from pulling out of the notch.

In the accompanying drawing,

Fig. 1 is perspective view of my invention;

Fig. 2 is a top plan view thereof; and

Fig. 3 is a side elevation thereof.

My scraper comprises a blade 1 sharpened to form a scraping edge 2, which extends along the lower side thereof, while a rib 3 is formed along one side of the upper edge thereof and extends from end to end of the scraping blade.

Formed in the upper edge of the blade and rib 3 is a dove-tail notch 4 which has undercut sides 5 which taper from end to end, from the front to the back of the blade. This notch 4 receives an end of a handle 6, which may be wooden and which is effectively held in the notch by the shape of the sides thereof, the outer end being widened by conventional wedges or the like to fit the notch. This forms a secure and effective attachment between the blade and the handle and causes the blade to stand approximately at right angles to the length of the handle in the proper relation for scraping glue, floors, or the like.

At the same time, it holds the blade tight on the handle so that it will not come off. Any kind of glue is hard to remove, but this scraper will easily scrape off any hard glue, although it may be used for any similar purpose.

I claim,

1. A scraper comprising a scraping blade having a sharpened lower edge extending from end to end thereof, a rib formed on one side of the blade and extending along the upper edge thereof from end to end, said blade having a dove-tail notch in the upper edge thereof extending through the blade and through the rib, and a handle having an end secured in said notch and disposed approximately at right angles to the plane of the blade.

2. A scraper comprising an upright blade having a sharpened lower edge, and having a dove-tail notch in the upper edge thereof, said notch having the sides thereof tapering toward each other from the bottom toward the top of the notch and also tapering toward each other from the outer toward the inner ends thereof with narrow and widened ends, and a handle having an end projecting into the notch at the narrow end thereof with a widened portion fitting the wider end of the notch.

ISAAK LUBARSKY.